United States Patent [19]

Kishi et al.

[11] Patent Number: 5,018,939
[45] Date of Patent: May 28, 1991

[54] APPARATUS FOR SEPARATING IRON SHEETS

[75] Inventors: Tomomi Kishi; Kanshi Nonami; Masahiko Takeuchi; Naoyuki Yoshitani, all of Toyota; Hideo Niwa, Toyoake, all of Japan

[73] Assignees: Toyota Jidosha Kabushiki Kaisha; Sanmei Electric Co., Ltd., both of Aichi, Japan

[21] Appl. No.: 313,344

[22] Filed: Feb. 21, 1989

Related U.S. Application Data

[63] Continuation of Ser. No. 120,483, Nov. 13, 1987, abandoned.

[51] Int. Cl.⁵ .............................................. B65G 59/04
[52] U.S. Cl. .............................. 414/795.4; 271/18.1; 271/901; 414/796.5
[58] Field of Search .................... 271/18.1, 901; 414/795.4, 796.5, 797.1

[56] References Cited

U.S. PATENT DOCUMENTS

| | | | |
|---|---|---|---|
| 2,650,092 | 8/1953 | Wall | 271/18.1 |
| 2,860,874 | 11/1958 | Gulick | 271/18.1 X |
| 2,973,959 | 3/1961 | Stolk | 271/18.1 |
| 4,387,508 | 6/1983 | Wyatt | 271/901 X |

FOREIGN PATENT DOCUMENTS

| | | | |
|---|---|---|---|
| 0065737 | 12/1982 | European Pat. Off. | 414/122 |
| 0138175 | 12/1978 | Japan | 271/18.1 |
| 165847 | 7/1984 | Japan . | |
| 1220837 | 3/1986 | U.S.S.R. | 414/118 |

OTHER PUBLICATIONS

U.S. Patent Document No. 671,609; Chatterton, Robert; 12-5-1950.

Primary Examiner—Robert J. Spar
Assistant Examiner—Janice Krizek
Attorney, Agent, or Firm—Finnegan, Henderson, Farabow, Garrett and Dunner

[57] ABSTRACT

An apparatus for separating piled iron sheets one by one has a plurality of magnets arranged vertically with the same magnetic poles thereof facing each other. Magnetic fluxes generated from the magnets react with each other at a position between the magnets and flow horizontally and then vertically, with the result that opposite, vertically separating forces act on two superposed iron sheets.

10 Claims, 4 Drawing Sheets

APPARATUS FOR SEPARATING IRON SHEETS

This application is a continuation of application Ser. No. 120,483, filed Nov. 13, 1987, now abandoned.

BACKGROUND OF THE INVENTION

1. Field of the Invention

The present invention relates to an apparatus for separating piled iron sheets one by one, and more particularly to a separating apparatus using a magnetic force.

2. Description of the Prior Art

A sheet feeder adapted to remove piled iron sheets (blanks) one by one from an accommodating section (stocker) and to feed them to a press machine is provided for a press machine, for example. This sheet feeder is constituted by the aforementioned separating apparatus which separates piled iron sheets one by one and a conveyor for conveying the iron sheets separated from the separating apparatus. As a separating apparatus, one which uses a magnetic force (e.g. Japanese Patent Laid-Open No. 165847/1984) tends to be used widely since its structure is simple.

FIG. 8 shows a conventional separating apparatus which makes use of such a magnetic force. A separating apparatus which is denoted by reference numeral 1 contains in a rectangular parallelepiped-shape case 2 a permanent magnet 3 in such a manner that the north and south poles (N and S poles) are arranged horizontally. If this separating apparatus 1 is brought into contact with piled iron sheets 4a, 4b, ..., a flow of a large magnetic flux is generated in end portions of the iron sheets 4a, 4b, i.e., portions in the vicinity of the contacting portions, as shown by an arrow A with a dotted line, so that the N pole and the S pole are led to portions of the iron sheets corresponding to the N pole and the S pole of the magnet 3, respectively. Consequently, reactionary forces are generated at a position between the adjacent iron sheets 4a, 4b, ... owing to the same polarity, and the iron sheets 4a, 4b, ... are separated from each other, as shown in the drawing. Incidentally, the separated iron sheets are removed consecutively as each of them is lifted up by a vacuum cup or a magnet plate (neither are shown).

However, with the above-described separating apparatus, as shown in FIG. 9, horizontal sucking forces Fp' acting toward the side of the separating apparatus 1 act on the iron sheets 4a, 4b, ... in addition to vertically separating forces Fs'. In addition, this suction force Fp' is generally greater than the separating force Fs'. For this reason, at the time when the uppermost iron sheet 4a is lifted up, a large frictional force acts between the case 2 of the separating apparatus 1 and the iron sheet. Consequently, there have been cases where the iron sheet 4a drops from the vacuum cup or the magnetic plate.

In addition, the separating force Fs' is very small unless the iron sheets 4a, 4b, ... abut uniformly against the case 2 of the separating apparatus 1. Accordingly, a special guide for positioning and guiding the iron sheets into the stocker has been required. In addition, the external configuration of the separating apparatus has been restricted to a square type, so that the separation of iron sheets having a different configuration has been impossible. Thus, there have been drawbacks in that numerous restrictions are imposed in practical use.

SUMMARY OF THE INVENTION

Accordingly, an object of the present invention is to provide an apparatus for separating iron sheets which allows iron sheets to be separated positively by virtue of an arrangement of magnetic poles that is utterly different from that of a conventional separating apparatus, and which offers a wide range of usage, thereby overcoming the drawbacks of the prior art.

To this end, according to the present invention, there is provided an apparatus for separating iron sheets, comprising a plurality of magnets arranged vertically with the same magnetic poles thereof facing each other.

Each of the aforementioned magnets may be formed by either a permanent magnet or an electromagnet, and its configuration can be made into a cylindrical shape or a rectangular parallelepiped. If the magnets are formed into a cylindrical shape, it is desirable to accommodate the magnets in a cylindrical case. Meanwhile, if the magnets are formed into a rectangular parallelepiped, it is preferred that one face thereof is selected as an acting surface, and a nonmagnetic guide plate for guiding the iron sheets is jointed to this surface, or the whole magnets are accommodated in a square case.

In addition, it is possible to impart directivity by providing an auxiliary magnet on the opposite side to the acting surface of each magnet, the direction of the arrangment of the poles of the auxiliary magnet being identical with that of the magnet, thereby allowing a greater amount of magnetic flux generating in the magnet to flow in the direction of a normal to the acting surface.

In the apparatus for separating iron sheets having the above-described arrangement, since the same poles are arranged to face each other, the magnetic fluxes are distributed vertically symmetrically, and magnetic fluxes generated from the magnets react with each other at a position between the magnets, flow linearly in the horizontal direction, and enter into or exit with a high density from the space between the surfaces of adjacent iron sheets. Consequently, large vertical, separating forces act on the superposed iron sheets in the direction of separating from each other, with the result that the iron sheets are positively separated from each other. At this juncture, a sucking force directed diagonally toward each magnet acts on each of the iron sheets. However, since the sucking force can be understood as being a resultant force from a force (a horizontal component) drawing the iron sheet directly to the side of the magnet and a force (a vertical component) separating the iron sheets from each other, this sucking force does not serve as a hindrance to the force lifting up the iron sheet, and the iron sheets can be removed smoothly without offsetting the separating force.

In addition, by virtue of the vertical arrangement of the magnets, the external configuration of the separating apparatus can be set as desired. Furthermore, even if the separating apparatus contacts the iron sheet at one point, or a slight gap exists between the separating apparatus and the iron sheet, the separating effect can be demonstrated by virtue of the flow of magnetic fluxes in the vertical direction. Moreover, it is possible for the separating apparatus to impart isotropy or directivity, as desired. Thus, the degree of freedom in design and installation increases remarkably.

DESCRIPTION OF THE PREFERRED EMBODIMENTS

Referring now to the accompanying drawings, description will be made of the embodiments of the present invention.

Figure 1:
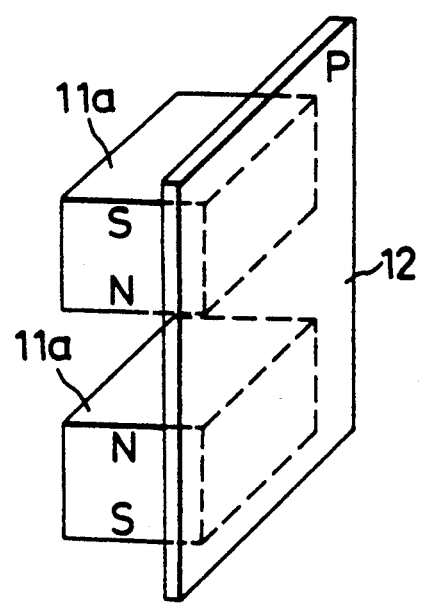
FIG. 1 is a schematic diagram of an embodiment of an apparatus for separating iron sheets in accordance with the present invention.
Figure 2:
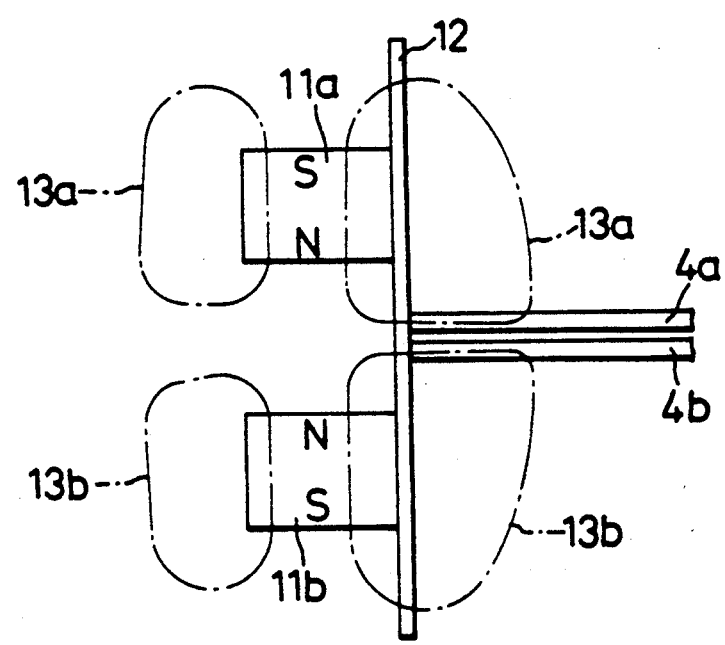
FIGS. 2 and 3 are schematic diagrams illustrating the basic principle of separation using the separating apparatus.

FIG. 1 shows one embodiment of an apparatus for separating iron sheets in accordance with the present invention. In the drawing, reference numerals 11a, 11b denote a pair of magnets arranged vertically with a suitable interval therebetween, a guide plate 12 being jointed to one surface of each of the magnets 11a, 11b. The magnets 11a, 11b are constituted by permanent magnets, and are arranged in such a manner that the same poles (the N pole in the illustrated case) face each other. Meanwhile, the guide plate 12 is constituted by a nonmagnetic material (e.g. JIS SUS304), and the other side P thereof serves as a guide surface for the iron sheets, as will be described later.

In the separating apparatus having the above-described arrangment, magnetic fluxes 13a, 13b generated from the N poles of the respective magnets 11a, 11b react with each other at a position midway between the magnets and consequently flow linearly in the horizontal direction. Subsequently, the magnetic fluxes 13a, 13b rise vertically and then head toward the opposite magnetic poles S, respectively. Accordingly, as illustrated in the drawing, if two superposed iron sheets 4a, 4b are positioned between the magnets 11a, 11b, each of the magnetic fluxes 13a, 13b enters with a high density into a space between the iron sheets 4a, 4b from the end surfaces thereof, and then exits vertically from the surfaces of the iron sheets 4a, 4b.

Figure 3:
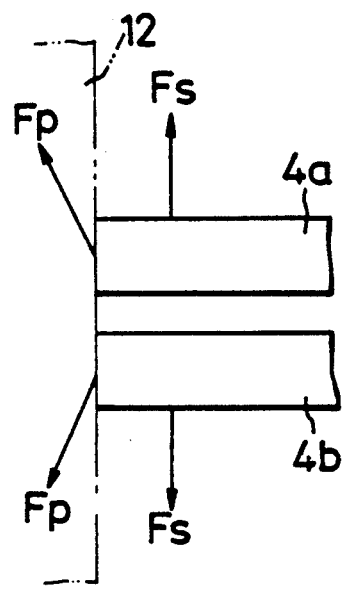

As a result, as shown in FIG. 3, large, separating forces Fs in the vertical, opposite directions act on the iron sheets 4a, 4b, thereby separating the iron sheets 4a, 4b from each other. At this juncture, sucking forces Fp directed diagonally toward the magnets 11a, 11b, respectively, act on the iron sheets 4a, 4b. However, since the sucking force can be understood as being a resultant force from a force (a horizontal component) drawing the iron sheet directly to the side of the magnet and a force (a vertical component) separating the iron sheets from each other, this sucking force does not serve as a hindrance to the force lifting up the iron sheet, and the separating force is not offset. Accordingly, at the time of the lifting operation, a frictional force does not act between the iron sheet 4a and the guide plate 12, so that the iron sheet 4a can be removed smoothly.

Figure 4:
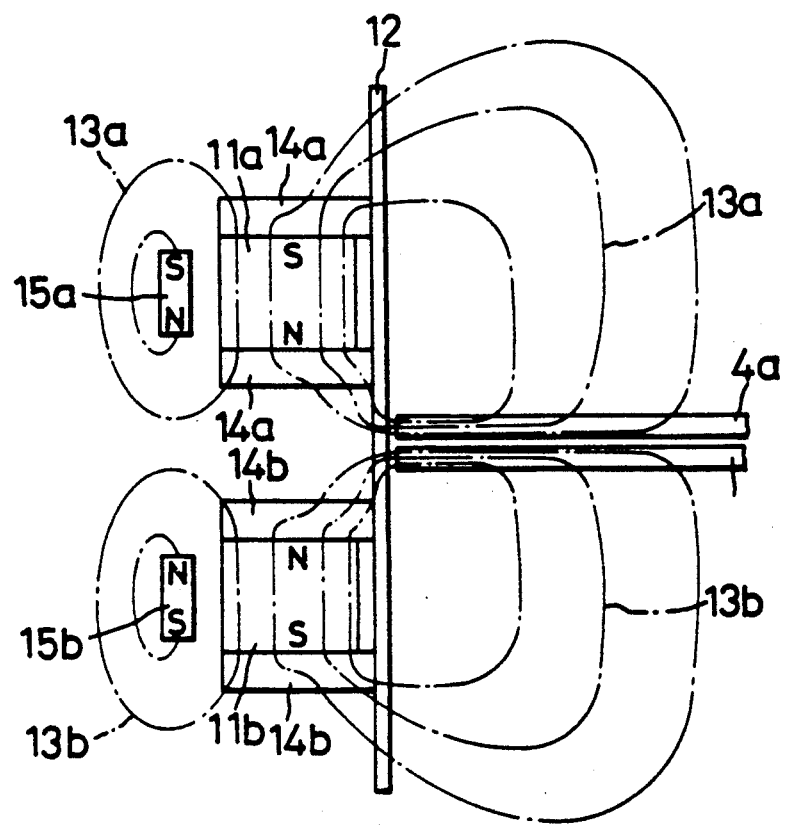
FIG. 4 is a schematic diagram of another embodiment of the separating apparatus and illustrates a basic principle of separation using the same.

FIG. 4 shows another embodiment of the present invention. The characteristic feature of this embodiment lies in that, in addition to the constituting element of the foregoing embodiment (FIG. 1), pairs of yokes 14a, 14b are provided on opposite ends of the magnets 11a, 11b, respectively, and auxiliary magnets 15a, 15b in which the direction of the arrangement of magnetic poles thereof is the same as that of the magnets are respectively provided on rear portions of the magnets 11a, 11b. As a result of this arrangement, the magnetic fluxes 13a, 13b are able to fly laterally farther by virtue of the action of the yokes 14a, 14b, and flow in such a manner as to be biased (directed) to the sides of the guide plate 12 by virtue of the action of the auxiliary magnets 15a, 15b. The effective magnetic fluxes increase by that margin, and the two superposed iron sheets 4a, 4b can be separated efficiently.

Figure 5:
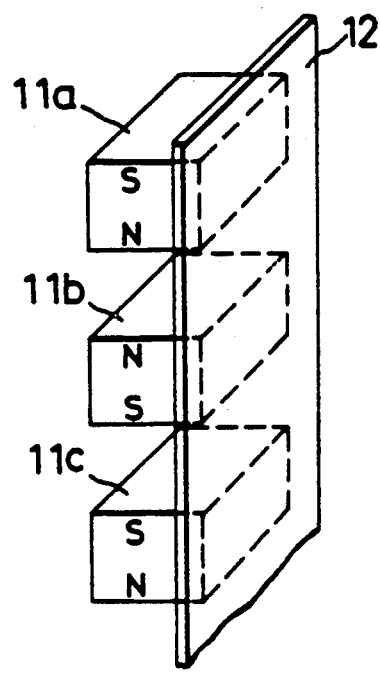
FIGS. 5–7 are schematic diagrams illustrating further embodiments of the separating apparatus.

Incidentally, although, in the two embodiments described above, an example has been shown in which the pair of magnets 11a, 11b are used, the number of the magnets should not be restricted, and it is possible to use a greater number of magnets 11a, 11b, 11c, ..., as shown in FIG. 5. In this case, since a separating force acts between each pair of the adjacent magnets, at the time when the iron sheet 4a of the two superposed sheets 4a, 4b, for instance, is to be moved between a lower pair of magnets, the iron sheet 4a is subjected to a separating action in an upper pair of magnets, thereby making it possible to effect more positive separation.

Figure 6:
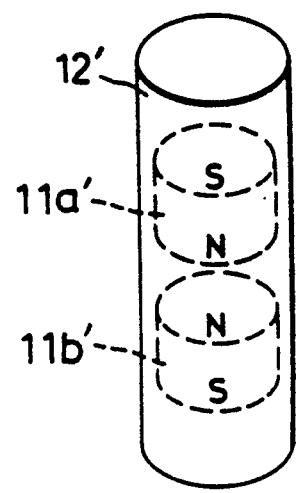

In addition, although, in the two embodiments described above, the magnets 11a, 11b are provided with the shape of a rectangular parallelepiped, the configuration of the magnets can be set as desired, and, for instance, cylindrically shaped magnets 11a', 11b' can be used, as shown in FIG. 6. In this case, the overall separating apparatus can be made slender by accommodating the magnets 11a', 11b' case 12.' Moreover, if the auxiliary magnets are omitted, isotropy increases, which results in a remarkable improvement in the degree of freedom in installation.

Figure 7:
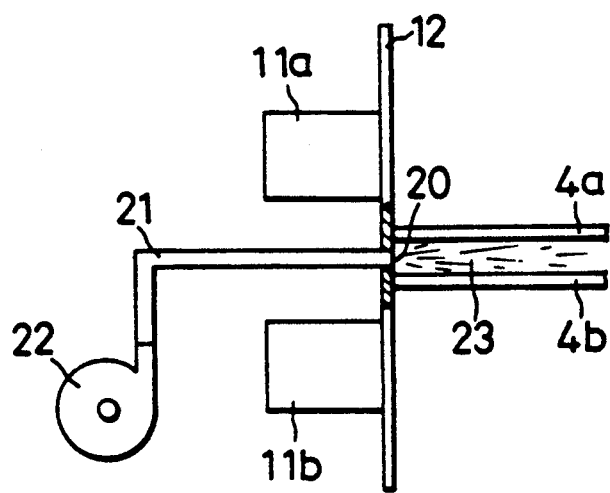
Figure 8:
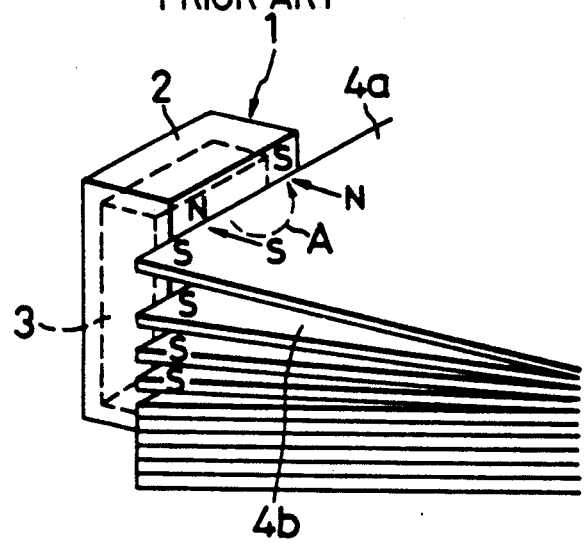
FIG. 8 is a perspective view of a conventional separating apparatus and illustrates a manner of using the same.
Figure 9:
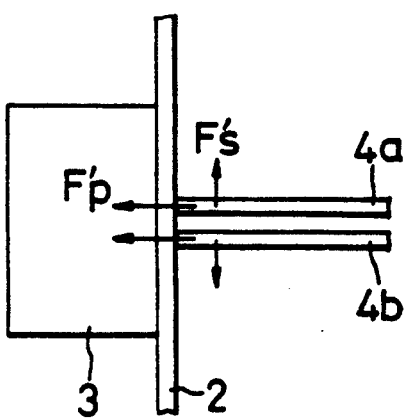
FIG. 9 is a diagram illustrating a basic principle of separation using the conventional separating apparatus.

Furthermore, as shown in FIG. 7, if a hole 20 may be provided in the guide plate 12 at an intermediate position thereof between the upper and lower magnets, and if this hole 20 is connected to a blower 22 via a pipe 21, air 23 can be blown from the hole 20 into a space between the iron sheets 4a, 4b. In this case, the separation of the iron sheets 4a, 4b can be further facilitated by the air 23.

It goes without saying that the rectangular parallelepiped-shaped magnets 11a, 11b (11c) used in FIGS. 1, 3, 5, and 7 may be arranged in such a manner as to be accommodated in a case instead of using the guide plate 12.

What we claim is

1. An apparatus for separating adjacent stacked iron sheets, comprising:
   at least a pair of main magnets, each having a first and second polarity portion with corresponding first and second opposite magnetic polarities;
   at least one pair of auxiliary magnets, each having a first and second polarity portion with respective first and second magnetic polarities corresponding to the first and second magnetic polarities of the pair of main magnets;
   each of said pair of main magnets being spaced a first distance from the stacked sheets and relative to each other for positioning in magnetic coupling adjacent opposite surfaces of the adjacent stacked sheets, and oriented in a predetermined direction with the first polarity portion of one of the pair of main magnets opposing the first polarity portion of the other of the pair of main magnets for generating in respective ones of the adjacent stacked sheets repelling magnetic flux patterns for separating one of the sheets from an adjacent sheet;

each of said pair of auxiliary magnets being disposed a second distance greater than the first distance from the stacked sheets adjacent and magnetically coupled to one of the main magnets, with the first and second polarity portions of the auxiliary magnets being oriented in the same predetermined direction as the first and second polarity portions of the corresponding magnetically coupled main magnets for generating a flux pattern for biasing the flux pattern of the corresponding main magnets, the biased flux pattern of the main magnets increasing the effectiveness of the generated repelling flux patterns of the main magnets.

2. The apparatus of claim 1, further comprising a pair of yokes disposed on opposite ends of each main magnet for increasing the lateral dimension of the generated flux pattern of the main magnets.

3. An apparatus for separating iron sheets according to claim 1, wherein each of said main magnets has the configuration of a rectangular parallelepiped.

4. An apparatus for separating iron sheets according to claim 1, wherein each of said main magnets has a side surface connecting the first and second polarity portions contiguous to a nonmagnetic guide plate.

5. An apparatus for separating iron sheets according to claim 1, wherein each of said main magnets has a cylindrical shape.

6. An apparatus for separating iron sheets according to claim 1, further comprising an enclosure for each of said main magnets, each of said enclosures surrounding a corresponding one of the main magnets.

7. An apparatus for separating iron sheets according to claim 3, wherein each of said main magnets has a side surface connecting the first and second polarity portions contiguous to a nonmagnetic guide plate.

8. An apparatus for separating iron sheets according to claim 3, further comprising an enclosure for each of said main magnets, each of said enclosures surrounding a corresponding one of the main magnets.

9. An apparatus for separating iron sheets according to claim 5, further comprising an enclosure for each said main magnets, each of said enclosures surrounding a corresponding one of the main magnets.

10. The apparatus of claim 4, wherein each of the auxiliary magnets is operative to direct the generated flux pattern of the corresponding main magnet in the direction of and through the guide plate.

* * * * *